US005944996A

United States Patent [19]

DeSimone et al.

[11] Patent Number: 5,944,996

[45] Date of Patent: Aug. 31, 1999

[54] CLEANING PROCESS USING CARBON DIOXIDE AS A SOLVENT AND EMPLOYING MOLECULARLY ENGINEERED SURFACTANTS

[75] Inventors: Joseph M. DeSimone, Chapel Hill; Timothy Romack, Durham; Douglas E. Betts, Chapel Hill; James B. McClain, Carrboro, all of N.C.

[73] Assignee: The University of North Carolina at Chapel Hill, Chapel Hill, N.C.

[21] Appl. No.: 08/850,371

[22] Filed: May 2, 1997

Related U.S. Application Data

[63] Continuation-in-part of application No. 08/553,082, Nov. 3, 1995, Pat. No. 5,783,082.

[51] Int. Cl.[6] .......... B01D 11/00

[52] U.S. Cl. .......... 210/634; 210/638; 210/767; 134/10; 134/11

[58] Field of Search .......... 210/634, 638, 210/639, 767; 134/10–13

[56] References Cited

U.S. PATENT DOCUMENTS

| | | | |
|---|---|---|---|
| 4,219,333 | 8/1980 | Harris | 137/8 |
| 4,877,530 | 10/1989 | Moses | 210/511 |
| 4,933,404 | 6/1990 | Beckman et al. | 526/207 |
| 5,158,704 | 10/1992 | Fulton et al. | 252/309 |
| 5,236,602 | 8/1993 | Jackson | 210/748 |
| 5,238,671 | 8/1993 | Matson et al. | 423/397 |
| 5,250,078 | 10/1993 | Saus et al. | 8/475 |
| 5,266,205 | 11/1993 | Fulton et al. | 210/639 |
| 5,267,455 | 12/1993 | Dewees et al. | 68/5 |
| 5,269,815 | 12/1993 | Schlenker et al. | 8/475 |
| 5,298,032 | 3/1994 | Schlenker et al. | 8/475 |
| 5,306,350 | 4/1994 | Hoy et al. | 134/22.14 |
| 5,312,882 | 5/1994 | DeSimone et al. | 134/34 |
| 5,316,591 | 5/1994 | Chao et al. | 134/34 |
| 5,356,538 | 10/1994 | Wai et al. | 210/634 |
| 5,377,705 | 1/1995 | Smith, Jr. et al. | 134/95.3 |
| 5,412,958 | 5/1995 | Iliff et al. | 68/5 |
| 5,474,812 | 12/1995 | Truckenmüller et al. | 427/430.1 |
| 5,501,761 | 3/1996 | Evans et al. | 156/344 |
| 5,509,431 | 4/1996 | Smith, Jr. et al. | 134/95.1 |
| 5,669,251 | 9/1997 | Townsend et al. | 68/58 |
| 5,676,705 | 10/1997 | Jureller et al. | 8/142 |
| 5,683,473 | 11/1997 | Jureller et al. | 8/142 |
| 5,783,082 | 7/1998 | DeSimone et al. | 210/634 |

FOREIGN PATENT DOCUMENTS

| | | | |
|---|---|---|---|
| 0518653 A1 | 12/1992 | European Pat. Off. . | |
| 0620270 A2 | 10/1994 | European Pat. Off. . | |
| 0 620 270 A2 | 11/1994 | European Pat. Off. . | |
| 06798753 A2 | 4/1995 | European Pat. Off. . | |
| 0711864 A1 | 10/1995 | European Pat. Off. . | |
| 3904514A1 | 2/1989 | Germany | D06L 1/00 |
| 3906724A1 | 3/1989 | Germany | D06P 1/00 |
| 3906735A1 | 3/1989 | Germany | D06L 3/00 |
| 3906737A1 | 3/1989 | Germany | D06M 11/59 |
| 4004111A1 | 2/1990 | Germany | D06L 1/00 |
| 4344021A1 | 12/1993 | Germany | D06P 1/16 |
| 4429470A1 | 8/1994 | Germany | D06P 5/04 |
| WO 93/14255 | 1/1992 | WIPO | D06B 5/15 |
| WO 93/14259 | 1/1992 | WIPO | D06M 11/76 |
| WO 93/20116 | 10/1993 | WIPO . | |
| WO 96/27704 | 3/1995 | WIPO . | |

OTHER PUBLICATIONS

Consani, K.A., and Smith, R.D., Observations on the Solubility of Surfactants and Related Molecules in Carbon Dioxide at 50° C., *The Journal of Supercritical Fluids*, 3, (1990), pp. 51–65.

E. Muary et al., Graft Copolymer Surfactants for Supercritical Carbon Dioxide Applications, *American Chemical Society Division of Polymer Chemistry*, 34(2):664, 1993.

K.M. Motyl; Cleaning Metal Substrates Using Liquid/Supercritical Fluid Carbon Dioxide, U.S. Dept. of Commerce, *NTIS* pp. 1–31 (Jan. 1988).

K. Johnston et al., Pressure Tuning of REverse Micelles for Adjustable Solvation of Hydrophiles in Supercritical Fluids, *Supercritical Fluids Science and Technology*, ACS Symposium Series 406, p. pp. 140–164, 1988.

Z. Guan et al.; Fluorocarbon–Based Heterphase Polymeric Materials. 1. Block Copolymer Surfactants for Carbon Dioxide Applications, *Macromolecules* 27:5527–5532 (1994).

G. McFann et al., Phase Behavior of AOT Microemulsions in Compressible Liquids, *J. Phys. Chem*, 95(12):4889–4896, 1991.

Jaspers et al., Diacryl, A New High Performance Styrene Free Vinyl Ester Resin, 35th Annual Technical Conference, Reinforced Plastics/Composites Institute, the Society of the Plastics Industry, Inc., Section 10F, pp. 1–8, 1980.

P. Yazdi et al., Reverse Micelles in Supercritical Fluids. 2. Fluorescence and Absorpotion Spectral Probes of Adjustable Aggregatin in the Two–Phase Region, *J. Phys. Chem.*, 94(18):7224–7232, 1990H.

G. McFann et al., Solubilization in Nonionic Reverse Micelles in Carbon Dioxide, *AIChE Journal*, 40(3):543–555, Mar. 1994.

*Primary Examiner*—Ana Fortuna
*Attorney, Agent, or Firm*—Myers Bigel Sibley & Sajovec

[57] ABSTRACT

The separation of a contaminant from a substrate that carries the contaminant is disclosed. The process comprises contacting the substrate to a carbon dioxide fluid containing an amphiphilic species so that the contaminant associates with the amphiphilic species and becomes entrained in the carbon dioxide fluid. The substrate is then separated from the carbon dioxide fluid, and then the contaminant is separated from the carbon dioxide fluid.

31 Claims, No Drawings

CLEANING PROCESS USING CARBON DIOXIDE AS A SOLVENT AND EMPLOYING MOLECULARLY ENGINEERED SURFACTANTS

The instant application is a continuation-in-part application of U.S. patent application Ser. No. 08/553,082 filed on Nov. 3, 1995, now U.S. Pat. No. 5,783,082.

FIELD OF THE INVENTION

The present invention relates to a method of cleaning a contaminant from a substrate, and more particularly, to a method of cleaning a contaminant from a substrate using carbon dioxide and an amphiphilic species contained therein.

BACKGROUND OF THE INVENTION

In numerous industrial applications, it is desirable to sufficiently remove different contaminants from various metal, polymeric, ceramic, composite, glass, and natural material substrates. It is often required that the level of contaminant removal be sufficient such that the substrate can be subsequently used in an acceptable manner. Industrial contaminants which are typically removed include organic compounds (e.g., oil, grease, and polymers), inorganic compounds, and ionic compounds (e.g., salts).

In the past, halogenated solvents have been used to remove contaminants from various substrates and, in particular, chlorofluorocarbons have been employed. The use of such solvents, however, has been disfavored due to the associated environmental risks. Moreover, employing less volatile solvents (e.g., aqueous solvents) as a replacement to the halogenated solvents may be disadvantageous, since extensive post-cleaning drying of the cleaned substrate is often required.

As an alternative, carbon dioxide has been proposed to carry out contaminant removal, since the carbon dioxide poses reduced environmental risks. U.S. Pat. No. 5,316,591 proposes using liquified carbon dioxide to remove contaminants such as oil and grease from various substrate surfaces. Moreover, the use of carbon dioxide in conjunction with a co-solvent has also been reported in attempt to remove materials which possess limited solubility in carbon dioxide. For example, U.S. Pat. Nos. 5,306,350 and 5,377,705 propose employing supercritical carbon dioxide with various organic co-solvents to remove primarily organic contaminants.

In spite of the increased ability to remove contaminants which have limited solubility in carbon dioxide, there remains a need for carbon dioxide to remove a wide range of organic and inorganic materials such as high molecular weight non-polar and polar compounds, along with ionic compounds. Moreover, it would be desirable to remove these materials using more environmentally-acceptable additives in conjunction with carbon dioxide.

In view of the foregoing, it is an object of the present invention to provide a process for separating a wide range of contaminants from a substrate which does not require organic solvents.

SUMMARY OF THE INVENTION

These and other objects are satisfied by the present invention, which includes a process for separating a contaminant from a substrate that carries the contaminant. Specifically, the process comprises contacting the substrate to a carbon dioxide fluid containing an amphiphilic species so that the contaminant associates with the amphiphilic species and becomes entrained in the carbon dioxide fluid. The process may further comprise separating the substrate from the carbon dioxide fluid having the contaminant entrained therein, and then separating the contaminant from the carbon dioxide fluid.

The carbon dioxide fluid may be present in the supercritical, gaseous, or liquid phase. Preferably, the amphiphilic species employed in the carbon dioxide phase comprises a "$CO_2$-philic" segment which has an affinity for the $CO_2$. More preferably, the amphiphilic species further comprises a "$CO_2$-phobic" segment which does not have an affinity for the $CO_2$.

Various substrates may be cleaned in accordance with the invention. Exemplary substrates include polymers, metals, ceramics, glass, and composite mixtures thereof. Contaminants that may be separated from the substrate are numerous and include, for example, inorganic compounds, organic compounds, polymers, and particulate matter.

DETAILED DESCRIPTION OF THE PREFERRED EMBODIMENTS

The present invention is directed to a process for separating a contaminant from a substrate that carries the contaminant. Specifically, the process comprises contacting the substrate to a carbon dioxide fluid which contains an amphiphilic species. As a result, the contaminant associates with the amphiphilic species and becomes entrained in the carbon dioxide fluid. The process also comprises separating the substrate from the carbon dioxide fluid having the contaminant entrained therein, and then separating the contaminant from the carbon dioxide fluid.

For the purposes of the invention, carbon dioxide is employed as a fluid in a liquid, gaseous, or supercritical phase. If liquid $CO_2$ is used, the temperature employed during the process is preferably below 31° C. If gaseous $CO_2$ is used, it is preferred that the phase be employed at high pressure. As used herein, the term "high pressure" generally refers to $CO_2$ having a pressure from about 20 to about 73 bar. In the preferred embodiment, the $CO_2$ is utilized in a "supercritical" phase. As used herein, "supercritical" means that a fluid medium is at a temperature that is sufficiently high that it cannot be liquified by pressure. The thermodynamic properties of $CO_2$ are reported in Hyatt, *J. Org. Chem.* 49: 5097–5101 (1984); therein, it is stated that the critical temperature of $CO_2$ is about 31° C.; thus the method of the present invention should be carried out at a temperature above 31°.

The $CO_2$ fluid employed in the process of the invention may be a non-aqueous fluid. The term "non aqueous" refers to the fluid being substantially free of water, generally containing less than about 5 percent by weight/volume of water. Preferably, the non-aqueous fluid contains less than about 2 weight/volume percent, more preferably less than 1 weight/volume percent, and most preferably less than about 0.5 weight/volume percent.

Although not necessary, the $CO_2$ fluid can be employed in a multi-phase system with appropriate and known aqueous and organic liquid co-solvents. Such solvents may be those that are miscible or immiscible in the $CO_2$ fluid and include, for example, fluorinated solvents, alcohols, hydrocarbons, ethers, ketones, amines, and mixtures of the above. In such a multi-phase system, the $CO_2$ fluid can be used prior to, during, or after the substrate is contacted by the liquid solvent. In these instances, the $CO_2$ serves as a second fluid to facilitate the transport of the contaminant from the substrate.

The process of the present invention employs an amphiphilic species contained within the carbon dioxide fluid. The amphiphilic species should be one that is surface active in $CO_2$ and thus creates a dispersed phase of matter which would otherwise exhibit low solubility in the carbon dioxide fluid. In general, the amphiphilic species lowers interfacial tension between the contaminant and the $CO_2$ phase to promote the entrainment of the contaminant in the $CO_2$ phase. The amphiphilic species is generally present in the carbon dioxide fluid from 0.001 to 30 weight percent. It is preferred that the amphiphilic species contain a segment which has an affinity for the $CO_2$ phase ("$CO_2$-philic"). More preferably, the amphiphilic species also contains a segment which does not have an affinity for the $CO_2$-phase ("$CO_2$-phobic") and may be covalently joined to the $CO_2$-philic segment.

Exemplary $CO_2$-philic segments may include a fluorine-containing segment or a siloxane-containing segment. The fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers,* 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctanesulfonamido)ethyl acrylate ("EtFOSEA"), 2-(N-ethylperfluorooctanesulfonamido)ethyl methacrylate ("EtFOSEMA"), 2-(N-methylperfluorooctanesulfonamido)ethyl acrylate ("MeFOSEA"), 2-(N-methylperfluorooctanesulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydro perfluoroalkylacrylate, 1,1',2,2'-tetrahydro perfluoroalkylmethacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes.

Exemplary $CO_2$-phobic segments may comprise common lipophilic, oleophilic, and aromatic polymers, as well as oligomers formed from monomers such as ethylene, α-olefins, styrenics, acrylates, ethylene and propylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles.

Amphiphilic species which are suitable for the invention may be in the form of, for example, random, block (e.g., di-block, tri-block, or multi-block), blocky (those from step growth polymerization), and star homopolymers, copolymers, and co-oligomers. Graft copolymers may be also be used and include, for example, poly(styrene-g-dimethylsiloxane), poly(methyl acrylate-g-1, 1'dihydroperfluorooctyl methacrylate), and poly(1,1'-dihydroperfluorooctyl acrylate-g-styrene). Other examples can be found in I. Piirma, *Polymeric Surfactants* (Marcel Dekker 1992); and G. Odian, *Principals of Polymerization* (John Wiley and Sons, Inc. 1991). Moreover, it should be emphasized that non-polymeric molecules may be used such as perfluorooctanoic acid, perfluoro(2-propoxy propanoic) acid, fluorinated alcohols and diols, along with various fluorinated acids. For the purposes of the invention, two or more amphiphilic species may be employed in the $CO_2$ phase.

A co-surfactant may be used in the $CO_2$ phase in addition to the amphiphilic species. In general, co-surfactants are those compounds which may not be surface active, but that modify the action of the amphiphilic species. Suitable co-surfactants for the invention are well known by those skilled in the art.

Other additives may be employed in the carbon dioxide fluid in order to modify the physical properties of the fluid so as to promote association of the amphiphilic species with the contaminant and entrainment of the contaminant in the fluid. Such additives may include cosolvents, as well as rheology modifiers which are present in the form of polymers. Rheology modifiers are those components which may increase the viscosity of the $CO_2$ phase to facilitate contaminant removal. Exemplary polymers include, for example, perfluoropolyethers, fluoroalkyl polyacrylics, and siloxane oils. Additionally, other molecules may be employed including $C_1$–$C_{10}$ alcohols, $C_1$–$C_{10}$ branched or straight chained saturated or unsaturated hydrocarbons, ketones, carboxylic acids, N-methyl pyrrolidone, dimethylacetyamide, ethers, fluorocarbon solvents, and chlorofluorocarbon solvents. For the purposes of the invention, the additives are typically utilized up to their solubility limit in the $CO_2$ fluid employed during the separation.

In a number of applications, it may be preferable to use high boiling low vapor pressure cosolvents. For the purposes of the invention, high boiling, low vapor pressure cosolvents relate to those having a vapor pressure below 1 mm Hg at ambient temperature and pressure, and more preferably below 0.1 mm Hg. The solvents preferably have a flash point of 37.8° C. or higher, 60.5° C. or higher, and 93.3° C. or higher. Exemplary high boiling low vapor pressure cosolvents include petroleum-based solvents such as paraffins, isoparaffins, nathelenics, and mixtures thereof. Other co-solvents include alcohols such as isopropyl alcohol and hydrocarbon alcohols of 1 to 10 carbon atoms; fluorinated and other halogenated solvents (e.g., chlorotrifluoromethane, trichlorofluoromethane, perfluoropropane, chlorodifluoromethane, and sulfur hexafluoride); amines (e.g., N-methyl pyrrolidone); amides (e.g., dimethyl acetamide); aromatic solvents (e.g., benzene, toluene, and xylenes); esters (e.g., ethyl acetate, dibasic esters, and lactate esters); ethers (e.g., diethyl ether, tetrahydrofuran, and glycol ethers); aliphatic hydrocarbons (e.g., methane, ethane, propane, ammonium butane, n-pentane, and hexanes); oxides (e.g., nitrous oxide); olefins (e.g., ethylene and propylene); natural hydrocarbons (e.g., isoprenes, terpenes, and d-limonene); ketones (e.g., acetone and methyl ethyl ketone); organosilicones; alkyl pyrrolidones (e.g., N-methyl pyrrolidone); paraffins (e.g., isoparaffin); petroleum-based solvents and solvent mixtures; and any other compatible solvent or mixture that is available and suitable. Mixtures of the above may also be used. Co-surfactants may also be used and include longer chain alcohols (i.e., greater than $C_8$) such as octanol, decanol, dodecanol, cetyl, laurel, and the like; and species containing two or more alcohol groups or other hydrogen bonding functionalities; amides; amines; and other like components.

The process of the invention can be utilized in a number of industrial applications. Exemplary industrial applications include the cleaning of substrates utilized in metal forming and machining processes; coating processes; recycling processes; surgical implantation processes; high vacuum processes (e.g., optics); precision part cleaning and recycling processes which employ, for example, gyroscopes, laser guidance components and environmental equipment; biomolecule and purification processes; food and pharmaceutical processes; microelectronic maintenance and fabrication processes; and textile fiber and fabric-producing processes.

The substrates which are employed for the purposes of the invention are numerous and generally include all suitable materials capable of being cleaned. Exemplary substrates include porous and non-porous solids such as metals, glass, ceramics, synthetic and natural organic polymers, synthetic and natural inorganic polymers, composites, and other natural materials. Various liquids and gel-like substances may also be employed as substrates and include, for example, biomass, food products, and pharmaceutical. Mixtures of solids and liquids can also be utilized including various slurries, emulsions, and fluidized beds.

In general, the contaminants may encompass materials such as inorganic compounds, organic compounds which includes polar and non-polar compounds, polymers, oligomers, particulate matter, as well as other materials. Inorganic and organic compounds may be interpreted to encompass oils as well as all compounds. The contaminant may be isolated from the $CO_2$ and amphiphilic species to be utilized in further downstream operations. Specific examples of the contaminants include greases; lubricants; human residues such as fingerprints, body oils, and cosmetics; photoresists; pharmaceutical compounds; food products such as flavors and nutrients; dust; dirt; and residues generated from exposure to the environment.

The steps involved in the process of the present invention can be carried out using apparatus and conditions known to those who are skilled in the art. Typically, the process begins by providing a substrate with a contaminant carried thereon in an appropriate high pressure vessel. The amphiphilic species is then typically introduced into the vessel. Carbon dioxide fluid is usually then added to the vessel and then the vessel is heated and pressurized. Alternatively, the carbon dioxide and the amphiphilic species may be introduced into the vessel simultaneously. Upon charging the vessel with $CO_2$, the amphiphilic species becomes contained in the $CO_2$. The $CO_2$ fluid then contacts the substrate and the contaminant associates with the amphiphilic species and becomes entrained in the fluid. During this time, the vessel is preferably agitated by known techniques. Depending on the conditions employed in the separation process, varying portions of the contaminant may be removed from the substrate, ranging from relatively small amounts to nearly all of the contaminant.

The substrate is then separated from the $CO_2$ fluid by any suitable method, such as by purging the $CO_2$ for example. Subsequently, the contaminant is separated from the $CO_2$ fluid. Any known technique may be employed for this step; preferably, temperature and pressure profiling of the fluid is employed to vary the solubility of the contaminant in the $CO_2$ such that it separates out of the fluid. In addition, the same technique may be used to separate the amphiphilic species from the $CO_2$ fluid. Additionally, a co-solvent or any other additive material can be separated. Any of the materials may be recycled for subsequent use in accordance with known methods. For example, the temperature and pressure of the vessel may be varied to facilitate removal of residual surfactant from the substrate being cleaned.

In addition to the steps for separating the contaminant described above, additional steps may be employed in the present invention. For example, prior to contacting the substrate with the $CO_2$ fluid, the substrate may be contacted with a solvent to facilitate subsequent removal of the contaminant from the substrate. The selection of the solvent to be used in this step often depends on the nature of the contaminant. As an illustration, a hydrogen fluoride or hydrogen fluoride mixture has been found to facilitate the removal of polymeric material, such as poly(isobutylene) films. Exemplary solvents for this purpose are described in U.S. Pat. No. 5,377,705 to Smith, Jr. et al., the contents of which are incorporated herein by reference.

A wide range of modes of agitation may be employed with the processes of the present invention. One mode may pertain to the impingement and/or flow of the fluid past, into, onto, or through a substrate. Examples under this mode include the use of well stirred tanks in which the substrate is essentially fixed in a vessel and the fluid is stirred to cause momentum transfer to the substrate. Fluid jets may also be used in this mode and include embodiments in which the fluid jets are immersed in the fluid along with the substrate (similar to a jacuzzi), and in which a stream of pressurized fluid external to the substrate contacts the substrate. Flow in tubing or piping, e.g., turbulent flow, may also be employed which includes for example the cleaning of the inside of tubing and pipes. Forced flow over and/or between and/or through the substrate may be used and includes a static tank with fluid flowing over or through the substrate as well as systems similar to packed beds in which the packing would be cleaned. Sonics, ultrasonics, and megasonics may also be employed, and may be particularly advantageous in applications involving a liquid continuous phase fluid. Particularly for the case of sonic energy, additives and amphiphiles entrained in the $CO_2$ phase may enhance the effectiveness of sonic cavitation as an agitation mode.

A second mode of agitation relates to the movement of the substrate through the fluid. An example of this mode pertains to rotating a piece of a holder or container having the substrate located therein. Specifically, this may include centrifugal action in which one spins a basket containing various substrates (e.g., parts) through a static fluid.

Combinations of the above two modes may also be used. For example, this may include the recirculation of a fluid with impingement upon the parts during a "well stirred tank" or "sonication" cycle. Another example relates to the cleaning of textiles in a tumbling wheel in which both the substrate (e.g., cloth) and the fluid are in motion in a semi-independent manner.

Scouring action may be employed with any of the modes described above. Examples of scouring actions include the use of brushes which may be actuated by an internal drive or an external drive as described in greater detail herein. Grit, pumice, sand, $CO_2$-insoluble plastics (poly(ethylene), poly(tetrafluoroethylene)), glass, and metals may also be used.

Various methods of powering agitation may be used in the processes of the present invention. These relate to powering a motor, rotor, plunger, impeller(s), actuator, oscillating systems, and the like. These are generally applicable as a means of getting mechanical energy into a $CO_2$ fluid system. Internal drives may be used in powering agitation. Such drives may be hydraulically driven in which the pressure gradient of either a $CO_2$ fluid, or a second fluid or gas in a recirculation system provides drive or agitation energy. The variable in these instances is typically the pressure gradient of the drive fluid across the internal drive mechanism. Potential drive fluids include, for example, $CO_2$-based fluids such as pure $CO_2$ (fresh addition of new $CO_2$ from storage, supply rinsing fluid, vapor from separators within the process, etc.); and processing fluid which may encompass $CO_2$ and any combination of the cleaning components described herein. An external drive fluid which may be used in the liquid, gaseous, or supercritical form. Immiscible fluids can also be used in hydraulically driven systems. These include head pressure gas (e.g., helium or other $CO_2$ immiscible gases), and water or another second liquid phase system which may be especially applicable to the multi-phase separation of a contaminant from a substrate. Miscible or immiscible drive fluids or gases may be used such that the drive fluids or gases exit a drive motor through a fitting to the outside of a pressure vessel rather than into the inside of the cleaning vessel. Utilization of such fluids should be viable so long as the drive fluid operates at a high pressure approximately equal to the cleaning fluid. Seals similar to those used in an air operated piston pump for $CO_2$ service should be sufficient. In the embodiments which feature internal drives, it is preferred to operate a motor inside of a vessel or tank.

External drives may also be used to power the agitation of the system. Examples of external drives include indirect drives which operate through pressure coupling of the agitation force. These may encompass the field included (e.g., magnetic, electronic, etc.) coupling of the agitation system inside a pressurized system to a drive force outside the pressurized system. External drives may also include direct drives through pressure coupling of the agitation force. Examples of direct drives encompass drive shafts that penetrate the pressure vessel with the motor on the outside of the pressure vessel. Methods of sealing of a rotating shaft across a differential pressure include sealed rotating coupling and packing around rotating shafts. Hydraulically back pressured systems can also be used and include those which may or may not utilize pressurized process fluid or a component of a process fluid (e.g., pure $CO_2$) as the hydraulic back pressure.

The present invention is explained in greater detail herein in the following examples, which are illustrative and are not to be taken as limiting of the invention.

EXAMPLE 1

Cleaning of Poly(styrene)Oligomer from Aluminum

A 0.1271 g sample of $CO_2$ insoluble 500 g/mol solid poly(styrene) is added to a clean, preweighed aluminum boat which occupies the bottom one-third of a 25 mL high pressure cell. A 0.2485 charge of an amphiphilic species, a 34.9 kg/mol poly(1,1'-dihydroperfluorooctylacrylate)-b-6.6 kg/mol poly(styrene) block copolymer is added to the cell outside of the boat. The cell is equipped with a magnetically coupled paddle stirrer which provides stirring at a variable and controlled rate. $CO_2$ is added to the cell to a pressure of 200 bar and the cell is heated to 40° C. After stirring for 15 minutes, four cell volumes, each containing 25 mL of $CO_2$ is flowed through the cell under isothermal and isobaric conditions at 10 mL/min. The cell is then vented to the atmosphere until empty. Cleaning efficiency is determined to be 36% by gravimetric analysis.

EXAMPLE 2

Cleaning of High Temperature Cutting Oil from Glass

A 1.5539 g sample of high temperature cutting oil was smeared on a clean, preweighed glass slide (1"×5/8"×0.04") with a cotton swab. A 0.4671 g sample of Dow Corning® Q2-5211 surfactant and the contaminated glass slide are added to a 25 mL high pressure cell equipped with a magnetically coupled paddle stirrer. The cell is then heated to 40° C. and pressurized to 340 bar with $CO_2$. After stirring for 15 minutes, four cell volumes each containing 25 mL of $CO_2$ is flowed through the cell under isothermal and isobaric conditions at 10 mL/min. The cell is then vented to the atmosphere. Cleaning efficiency is determined to be 78% by gravimetric analysis.

EXAMPLE 3

Cleaning of Poly(styrene)Oligomer from Glass

A 0.0299 g sample of polystyrene oligomer ($M_n$=500 g/mol) was smeared on a clean, preweighed glass slide (1"×5/8×0.04") with a cotton swab. A 0.2485 g charge of an amphiphilic species, a 34.9 kg/mol poly(1,1'-dihydroperfluoroyctylacrylate)-b-6.6 kg/mol poly(styrene) block copolymer, and the contaminated glass slide are added to a 25 mL high pressure cell equipped with a magnetically coupled paddle stirrer. The cell is then heated to 40° C. and pressurized to 340 bar with $CO_2$. After stirring for 15 minutes, four cell volumes, each containing 25 mL of $CO_2$, is flowed through the cell under isothermal and isobaric conditions at 10 mL/min. The cell is then vented to the atmosphere. Cleaning efficiency is determined to be 90% by gravimetric analysis.

EXAMPLES 4–5

Cleaning of Poly(styrene)Oligomer from Aluminum Using Various Amphiphilic Species Example 4–5 illustrate the cleaning of poly(styrene) oligomer from aluminum by employing different amphiphilic species.

EXAMPLE 4

The substrate described in Example 1 is cleaned utilizing perfluorooctanoic acid as the amphiphilic species.

EXAMPLE 5

The substrate described in Example 1 is cleaned utilizing perfluoro(2-propoxy propanoic) acid as the amphiphilic species.

EXAMPLES 6–18

Cleaning of Various Substrates

Examples 6–18 illustrate the cleaning of a variety of substrates by employing different amphiphilic species according to the system described in Example 1. The contaminants removed from the substrates include those specified and others which are known.

EXAMPLE 6

The system described in Example 1 is used to clean a photoresist with poly(1,1'-dihydroperfluorooctyl acrylate-b-methyl methacrylate) block copolymer. The photoresist is typically present in a circuit board utilized in various microelectronic applications. The cleaning of the photoresist may occur after installation and doping of the same in the circuit board.

EXAMPLE 7

The system described in Example 1 is used to clean the circuit board described in Example 6 with poly(1,1'- dihydroperfluorooctyl acrylate-b-vinyl acetate) block copolymer. Typically, the circuit board is cleaned after being contaminated with solder flux during attachment of various components to the board.

EXAMPLE 8

The system described in Example 1 is used to clean a precision part with poly(1,1'-dihydroperfluorooctyl methacrylate-b-styrene) copolymer. The precision part is typically one found in the machining of industrial components. As an example, the precision part may be a wheel bearing assembly or a metal part which is to be electroplated. Contaminants removed from the precision part include machining and fingerprint oil.

EXAMPLE 9

The system described in Example 1 is used to clean metal chip waste formed in a machining process with poly(1,1'-dihydroperfluorooctyl acrylate-co-styrene) random copolymer. Metal chip waste of this type is usually formed, for example, in the manufacture of cutting tools and drill bits.

EXAMPLE 10

The system described in Example 1 is used to clean a machine tool with poly(1,1'-dihydroperfluorooctyl acrylate-co-vinyl pyrrolidone) random copolymer. A machine tool of this type is typically used in the production of metal parts such as an end mill. A contaminant removed from the machine tool is cutting oil.

EXAMPLE 11

The system described in Example 1 is used to clean an optical lens with poly(1,1'-dihydroperfluorooctyl acrylate-co-2-ethylhexyl acrylate) random copolymer. An optical lenses especially suitable for cleaning include those employed, for example, in laboratory microscopes. Contaminants such as fingerprint oil and dust and environmental contaminants are removed from the optical lens.

EXAMPLE 12

The system described in Example 1 is used to clean a high vacuum component with poly(1,1'-dihydroperfluorooctyl acrylate-co-2-hydroxyethyl acrylate) random copolymer. High vacuum components of this type are typically employed, for example, in cryogenic night vision equipment.

EXAMPLE 13

The system described in Example 1 is used to clean a gyroscope with poly(1,1'-dihydroperfluorooctyl acrylate-co-dimethylaminoethyl acrylate) random copolymer. Gyroscopes of this type may be employed, for example, in military systems and in particular, military guidance systems. Contaminant removed from the gyroscope are various oils and particulate matter.

EXAMPLE 14

The system described in Example 1 is used to clean a membrane with poly(1,1'-dihydroperfluorooctylacrylate-b-styrene) block copolymer. Membranes of this type may be employed, for example, in separating organic and aqueous phases. In particular, the membranes in are especially suitable in petroleum applications to separate hydrocarbons (e.g., oil) from water.

EXAMPLE 15

The system described in Example 1 is used to clean a natural fiber with poly(1,1'-dihydroperfluorooctyl acrylate-b-methyl methacrylate) block copolymer. An example of a natural fiber which is cleaned is wool employed in various textile substrates (e.g., tufted carpet) and fabrics. Contaminants such as dirt, dust, grease, and sizing aids used in textile processing are removed from the natural fiber.

EXAMPLE 16

The system described in Example 1 is used to clean a synthetic fiber with poly(1,1'-dihydroperfluorooctyl acrylate-b-styrene) block copolymer. An example of a synthetic fiber which is cleaned is spun nylon employed solely, or in combination with other types of fibers in various nonwoven and woven fabrics. Contaminants such as dirt, dust, grease, and sizing aids used in textile processing are removed from the synthetic fiber.

EXAMPLE 17

The system described in Example 1 is used to clean a wiping rag used in an industrial application with poly(1,1'-dihydroperfluorooctyl acrylate-co-dimethylaminoethyl acrylate) random copolymer. Grease and dirt are contaminants removed from the wiping rag.

EXAMPLE 18

The system described in Example 1 is used to clean a silicon wafer with poly(1,1'-dihydroperfluorooctyl acrylate-co-2-hydroxyethyl acrylate) random copolymer. The silicon wafer may be employed, for example, in transistors which are used in microelectronic equipment. A contaminant which is removed from the silicon wafer is dust.

EXAMPLE 19

Utilization of Co-Solvent

The system described in Example 1 is cleaned in which a methanol cosolvent is employed in the $CO_2$ phase.

EXAMPLE 20

Utilization of Rheology Modifier

The system described in Example 1 is cleaned in which a rheology modifier is employed in the $CO_2$ phase.

EXAMPLE 21

Enhancement of the Solubility of an Amphiphilic Species with a High Boiling Petroleum Cosolvent A PDMS exthoxylate amphiphilic species is present in neat $CO_2$ below 1,200 psia at ambient temperature. When the amphiphilic species is mixed in a 1:1 (or greater) ratio with Isopar M™ cosolvent sold by Exxon Chemical Co. of Houston, Tex. The mixture is miscible in $CO_2$ above the vapor pressure of $CO_2$ at ambient temperature.

EXAMPLE 22

Enhancement of the Detergency of an Amphiphilic Species by the Addition of Small Amounts of an Alcohol Cosolvent A PDMS exthoxylate amphiphilic species is present in neat $CO_2$ below 1,200 psia at ambient temperature. Upon the addition of 0.5 percent of isopropyl alcohol, the system appears clear in that one liquid phase is present at 1,100 psia which exhibits detergency toward water soluble stain on cotton cloth.

EXAMPLE 23

Enhancement of the Solubility and Detergency of an Amphiphilic Species by the Addition of Hydrogen Bonding Additive and a Cosolvent Various concentrations of Isopar M™ and isopropyl alcohol are employed in $CO_2$ fluid systems in a 10 mL view cell. The results are monitored visually. The following table illustrates the results:

| Surfactant | Ispar M | IPA | Stable/IΦ | Detergency |
|---|---|---|---|---|
| 2.5% | 0 | 0 | — | 0 |
| 2.5% | 47.5% | 0 | 0–4500 | 0 |
| 2.5% | 47% | 0 | 0–850 | 0 |
| 2.5% | 46.5% | 0.5% | 750–1500 | 20 |

The numbers in the column labeled "stable/I Φ" refers to describes the pressure range over which the system is stable and one-phase. Detergency refers to the relative activity in cleaning poly-cotton cloth artificially stained with a purple food dye (International Fabricare Institute). For the purposes of the invention, 0 refers to no cleaning and 100 refers to completely clean.

The table indicates that the material is not a viable cleaning system for water soluble soils in neat $CO_2$. Upon the addition of Isopar M™, the system is stable and one phase at all pressures above the $CO_2$ vapor pressure. The isopropyl alcohol enhances the detergency of the system.

EXAMPLE 24

Enhancement of the Solubility and Detergency of an Amphiphilic Species by the Addition of Hydrogen Bonding Additive and a Cosolvent Various concentrations of ISOPAR M™ and isopropyl alcohol were employed in $CO_2$ fluid systems in a 10 mL view cell. The PDMS ethoxylated amphiphilic species employed was CH-03-44-02 from MiCELL Technologies of Raleigh, N.C. The results were monitored visually. The following table illustrates the results:

| Amphiphilic Species | Isopar M | isopropyl alcohol | Stable/IΦ | Detergency |
|---|---|---|---|---|
| 2% | 0 | 0 | 1200–4500 | 0 |
| 2% | 0 | 0.5% | 1100–4500 | 10% |
| 2% | 47.5% | 0 | — | 50% |
| 2% | 47.25% | 0.25% | 300–775 | 60% |

The addition of ISOPAR M ™ was found to enhance the detergency of the system.

The foregoing examples are illustrative of the present invention, and are not to be construed as limiting thereof. The invention is defined by the following claims, with equivalents of the claims to be included therein.

That which is claimed is:

1. A process for separating a contaminant from a substrate that carries the contaminant comprising:

contacting said substrate with a non-aqueous carbon dioxide fluid containing an amphiphilic species so that said contaminant associates with said amphiphilic species and becomes entrained in said carbon dioxide fluid, said substrate selected from the group consisting of metals, ceramics, glass, and composite mixtures thereof; then separating said substrate from said non-aqueous carbon dioxide fluid having said contaminant entrained therein; and then separating said contaminant from said non-aqueous carbon dioxide fluid.

2. A process according to claim 1, wherein said fluid comprises supercritical carbon dioxide.

3. A process according to claim 1, wherein said fluid comprises liquid carbon dioxide.

4. A process according to claim 1, wherein said fluid comprises gaseous carbon dioxide.

5. A process according to claim 1, wherein said contaminant is selected from the group consisting of inorganic compounds, organic compounds, polymers, and particulate matter.

6. A process according to claim 1, wherein said amphiphilic species comprises a $CO_2$-philic segment.

7. A process according to claim 6, wherein the $CO_2$-philic segment is a polymer comprising monomers selected from the group consisting of fluorine-containing segments and siloxane-containing containments.

8. A process according to claim 6, wherein said amphiphilic species comprises a $CO_2$-phobic segment.

9. A process according to claim 8, wherein the $CO_2$-phobic segment is a polymer comprising monomers selected from the group consisting of styrenics, α-olefins, ethylene and propylene oxides, dienes, amides, esters, sulfones, sulfonamides, imides, thiols, alcohols, diols, acids, ethers, ketones, cyanos, amines, quaternary ammonium salts, acrylates, and thiozoles.

10. A process according to claim 1, further comprising the step of contacting said substrate with a solvent prior to said step of contacting said substrate with said carbon dioxide fluid so as to facilitate removal of said contaminant.

11. A process according to claim 1, wherein said carbon dioxide fluid further comprises a cosolvent selected from the group consisting of high boling low vapor pressure solvents, alcohols, and mixtures thereof.

12. A process for separating a contaminant from a substrate that carries the contaminant comprising:

contacting said substrate with a non-aqueous carbon dioxide fluid containing an amphiphilic species so that said contaminant associates with said amphiphilic species and becomes entrained in said non-aqueous carbon dioxide fluid, said substrate selected from the group consisting of metals, ceramics, glass, and composite mixtures thereof.

13. A process according to claim 12, wherein said fluid comprises supercritical carbon dioxide.

14. A process according to claim 12, wherein said fluid comprises liquid carbon dioxide.

15. A process according to claim 12, wherein said fluid comprises gaseous carbon dioxide.

16. A process according to claim 12, wherein said contaminant is selected from the group consisting of inorganic compounds, organic compounds, polymers, and particulate matter.

17. A process according to claim 12, wherein said amphiphilic species comprises a $CO_2$-philic segment.

18. A process according to claim 17, wherein said amphiphilic species comprises a $CO_2$-phobic segment.

19. A process according to claim 18, wherein the $CO_2$-phobic segment is a polymer comprising monomers selected from the group consisting of styrenics, α-olefins, ethylene and propylene oxides, dienes, amides, esters, sulfones, sulfonamides, imides, thiols, alcohols, diols, acids, ethers, ketones, cyanos, amines, quaternary ammonium salts, acrylates, and thiozoles.

20. A process according to claim 17, wherein the $CO_2$-philic segment is a polymer comprising monomers selected from the group consisting of fluorine-containing segments and siloxane-containing segments.

21. A process according to claim 12, wherein said carbon dioxide fluid further comprises a cosolvent selected from the group consisting of high boling low vapor pressure solvents, alcohols, and mixtures thereof.

22. A process for separating a contaminant from a substrate that carries the contaminant comprising:

contacting said substrate with a non-aqueous carbon dioxide fluid containing an amphiphilic species so that said contaminant associates with said amphiphilic species and becomes entrained in said carbon dioxide fluid, wherein said substrate is selected from the group consisting of metals, ceramics, glass, and composite mixtures thereof; and then separating said contaminant from said non-aqueous carbon dioxide fluid.

23. A process according to claim 22, wherein said fluid comprises supercritical carbon dioxide.

24. A process according to claim 22, wherein said fluid comprises liquid carbon dioxide.

25. A process according to claim 22, wherein said fluid comprises gaseous carbon dioxide.

26. A process according to claim 22, wherein said contaminant is selected from the group consisting of inorganic compounds, organic compounds, polymers, and particulate matter.

27. A process according to claim 22, wherein said amphiphilic species comprises a $CO_2$-philic segment.

28. A process according to claim 27, wherein said amphiphilic species comprises a $CO_2$-phobic segment.

29. A process according to claim 28, wherein the $CO_2$-phobic segment is a polymer comprising monomers selected from the group consisting of styrenics, α-olefins, ethylene and propylene oxides, dienes, amides, esters, sulfones, sulfonamides, imides, thiols, alcohols, diols, acids, ethers, ketones, cyanos, amines, quaternary ammonium salts, acrylates, and thiozoles.

30. A process according to claim 27, wherein the $CO_2$-philic segment is a polymer comprising monomers selected from the group consisting of fluorine-containing segments and siloxane-containing containments.

31. A process according to claim 22, further comprising the step of contacting said substrate with a solvent prior to said step of contacting said substrate with said carbon dioxide fluid so as to facilitate removal of said contaminant.

* * * * *